United States Patent Office 3,525,420
Patented Aug. 25, 1970

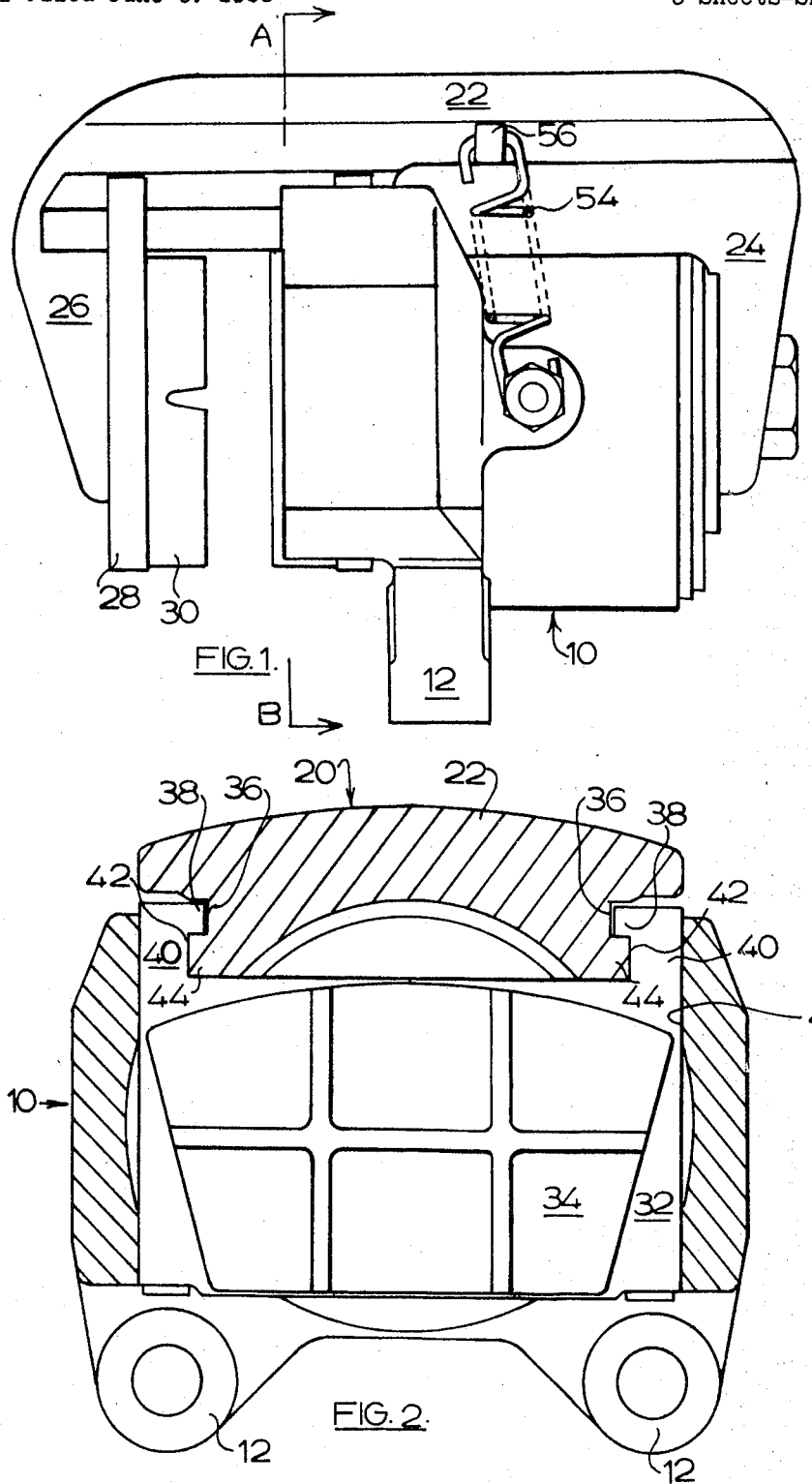

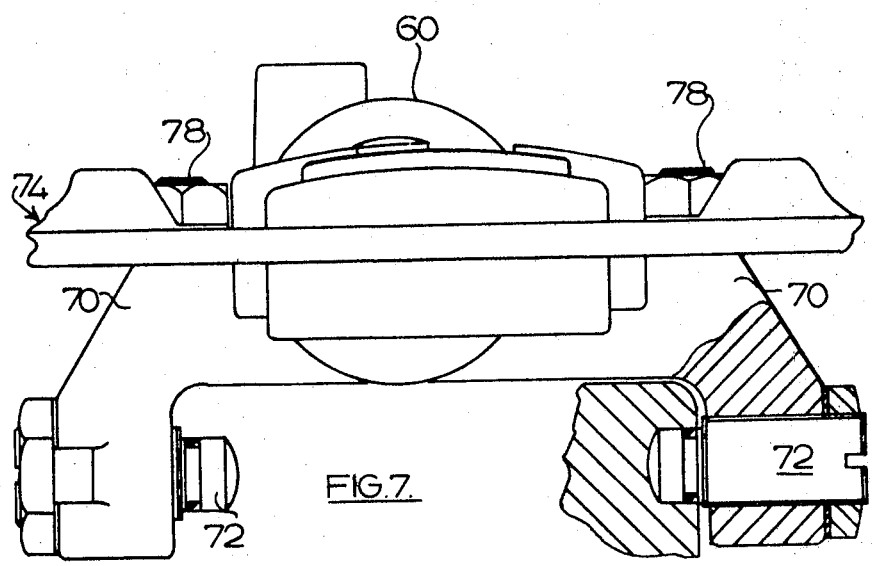

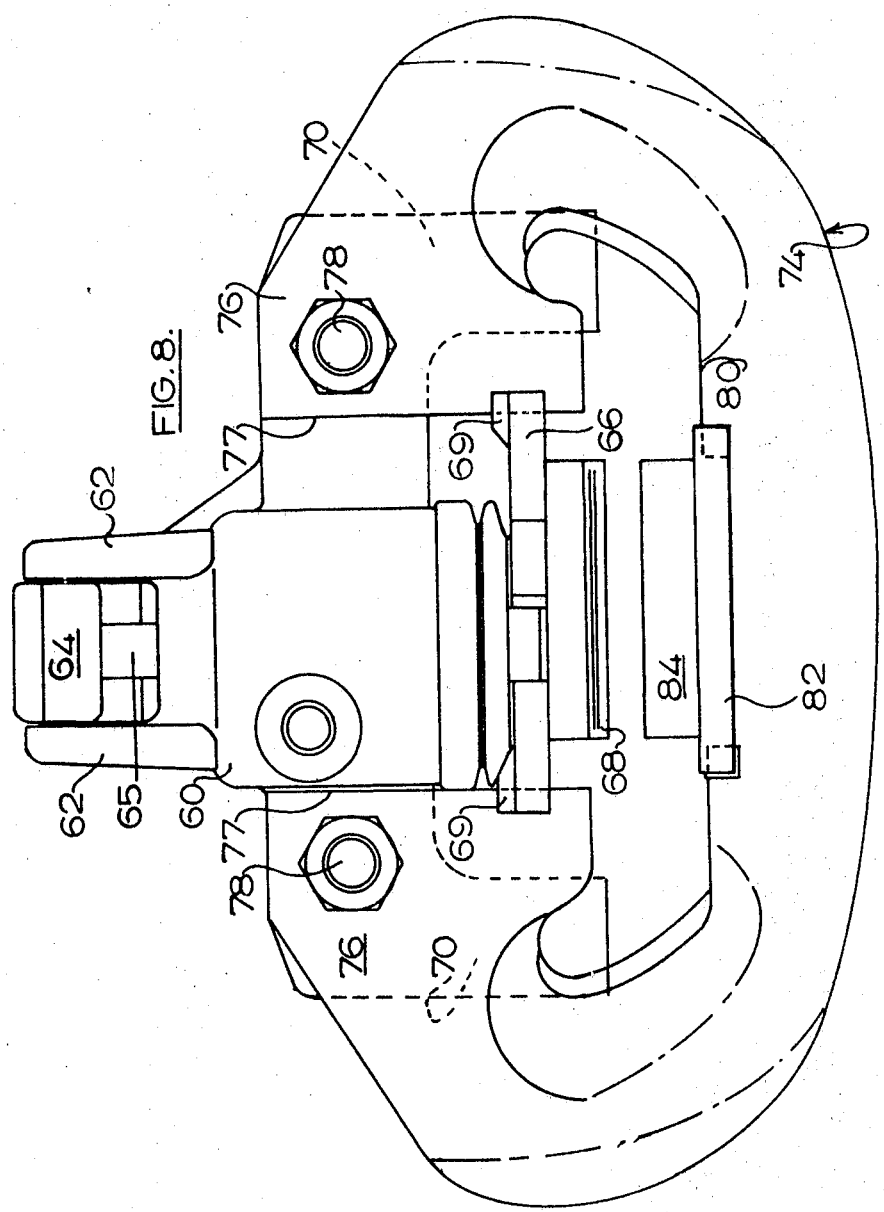

3,525,420
DISC BRAKE AND FRICTION PAD MOUNTING MEANS
Herman Hans Honick, Immendorf, Germany, and Robin A. Cochrane, Hollington, Glewstone, England, assignors to Girling Limited, Birmingham, Warwickshire, England, a British company
Continuation of application Ser. No. 556,178, June 8, 1966. This application June 25, 1968, Ser. No. 744,608
Claims priority, application Great Britain, June 9, 1965, 24,333/65
Int. Cl. F16d 55/224
U.S. Cl. 188—72.4                                    1 Claim

ABSTRACT OF THE DISCLOSURE

A disc brake assembly in which the brake actuator is mounted on a fixed member on one side of the braking disc and a yoke member is detachably secured to the actuator member and extends to the other side of the disc. Two friction elements are carried by the yoke, one on either side of the disc and the actuator is adapted to operate on the friction element of the same side of the disc as the actuator. The yoke and friction elements form a subassembly which is readily removable from the actuator member without disturbing the hydraulic connections to the actuator.

---

This is a continuation of Ser. No. 556,178, filed June 8, 1966, and now abandoned.

This invention concerns disc brakes and relates more particularly to disc brakes of the type having only one directly operated friction element urged by a power driven member into engagement with one side of a brake disc, the other friction element being carried on a yoke or saddle which moves it into engagement with the opposite side of the brake disc as a result of the reaction force set up by the directly operated friction element.

According to the present invention, a disc brake caliper or housing for supporting a pair of friction elements adapted to engage opposite sides of a brake disc comprises an actuator assembly including mechanically or fluid pressure operated thrust means for displacing one of said friction elements into engagement with the brake disc and a saddle or yoke carrying both said friction elements and detachably secured to said actuator assembly.

The actuator assembly may, for example, include a body member formed with an internal hydraulic cylinder having a pair of pistons arranged therein, one piston being associated with the directly operated friction element and the other piston having a saddle detachably secured to it and extending across the body member to a position in front of the same, where it provides a mounting for both friction elements.

Alternatively, the actuator assembly may comprise a hydraulic cylinder carried on a pivot member to which is detachably secured a yoke extending forwardly of the body member and provided with a central aperture which chordally circumscribes the brake disc, the yoke having a friction element mounted thereon on each side of the disc and extending into the central aperture.

Figures 3, 4:
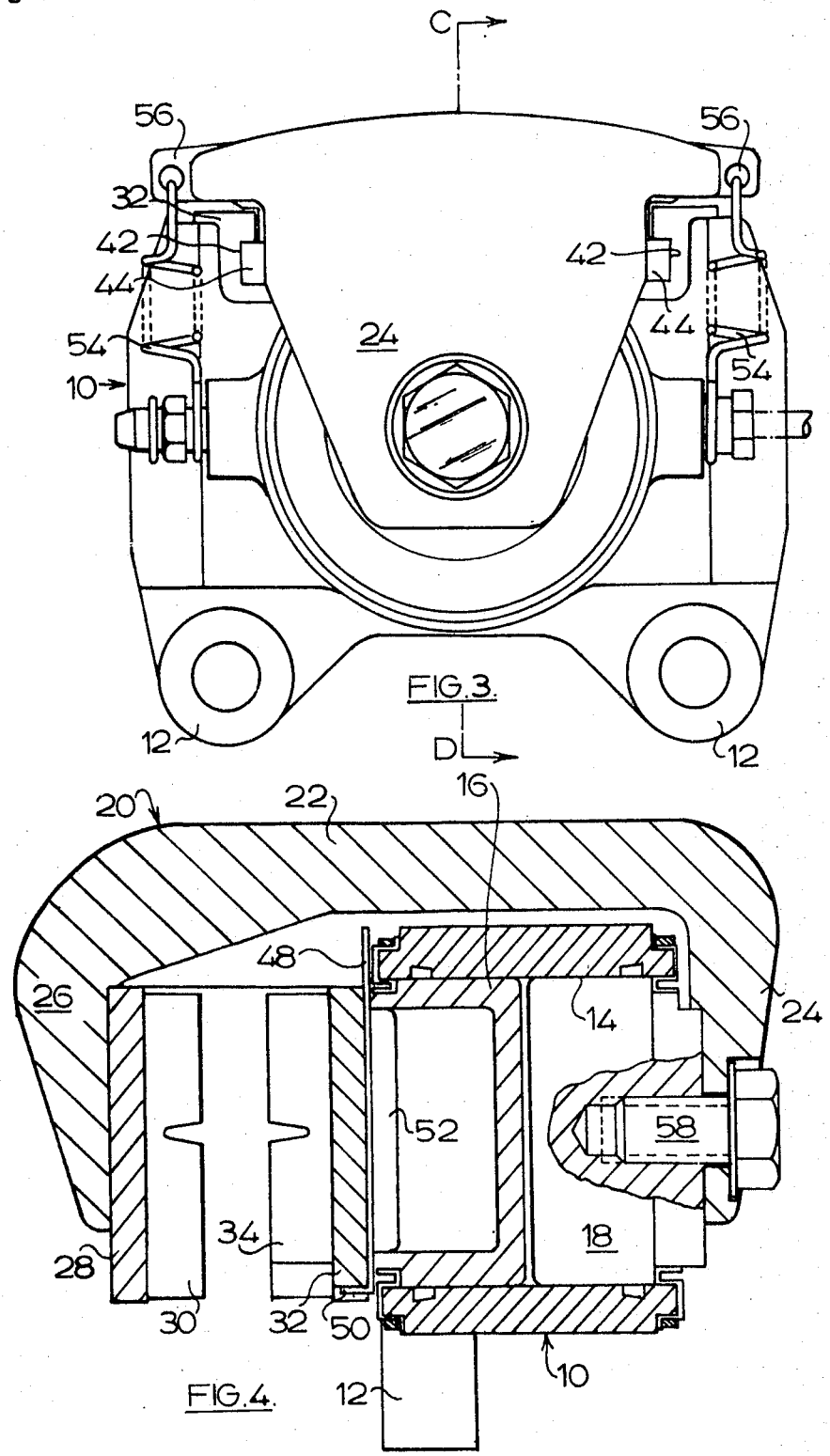
Figure 5:
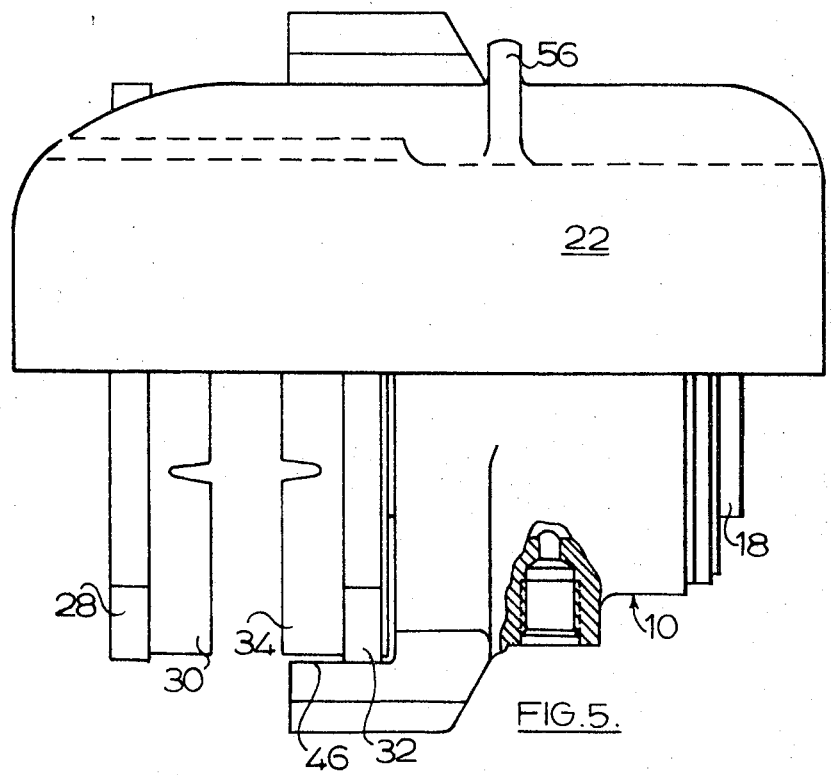
Figure 6:
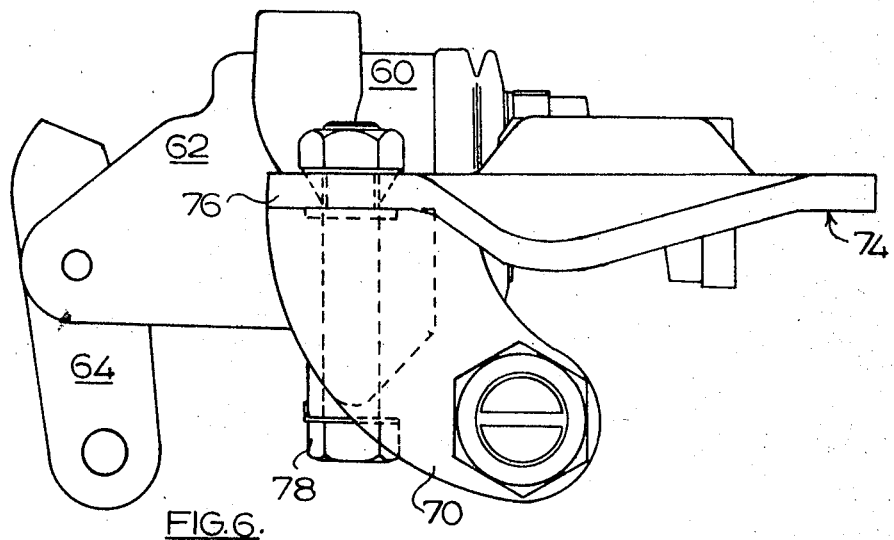

The invention will be described further, by way of example, with reference to the accompanying drawings, in which:

FIG. 1 is a side elevation of one disc brake caliper embodying the invention,
FIG. 2 is a section taken on the line A–B of FIG. 1,
FIG. 3 is a rear elevation,
FIG. 4 is a section taken on the line C–D of FIG. 3,
FIG. 5 is a plan view with a part of the saddle removed for clarity,
FIG. 6 is a side elevation of another embodiment of the invention,
FIG. 7 is a front elevation thereof, and
FIG. 8 is a plan view.

Referring firstly to the embodiment of the invention illustrated in FIGS. 1 to 5, an actuator assembly comprises a body member generally designated 10 and provided at its bottom edge with mounting lugs 12 by which it may be secured to a fixed part of a vehicle. Internally, the body member 10 is formed with a hydraulic cylinder 14 within which are arranged two hydraulic pistons 16 and 18. The rear piston 18 is solid and has secured to it, one limb 24 of a U-shaped saddle 20, the crown portion 22 of which passes over the body member 10 such that the other limb 26 depends in spaced relation therefrom, and a friction element comprising a backplate 28 carrying a pad 30 of friction material is fixed to the saddle limb so as to face one side of a brake disc (not shown). A second friction element comprising a backplate 32 carrying a pad 34 of friction material is mounted on the crown portion 22 of the saddle, which for this purpose is formed with lateral recesses 36 which are engaged by complementary lateral ribs 38 directed inwardly from upstanding marginal extensions 40 of the backplate 32. The ribs 38 cooperate with the upper edge of the backplate 32 to define further recesses 42 which in turn are engaged by laterally outwardly directed ribs 44 provided along the lower edge of the saddle crown portion 22. Parallel surfaces 46 are formed on the body member 10 for guiding and taking the drag from the directly actuated friction element 32, 34 and this same friction element is radially plate 32 and having two tabs 50 which engage under the lower edge of the backplate. The dished portion 52 of the plate 48, as shown in FIG. 4, locates within a recess in the piston 16. Hold down springs 54 are provided between the body member 10 and lateral projections 56 of the saddle 20.

As will be noted, the rear limb 24 of the saddle is detachably secured to the rear piston 18 by a bolt 58, while support for the forward part of the saddle is provided by the location of the dished portion 52 of the plate 48 in the front piston 16. The caliper construction thus provided is readily assembled or dismantled, so far as concerns the replacement of worn friction pads 30 and 34, by merely unfastening the bolt 58, releasing the hold down springs 54 and withdrawing the saddle from the remainder of the caliper, gently disengaging the backplate 32 from the locating plate 48 whilst this is being done. Preferably, although not visible in the drawings, the rear piston is provided with flats to prevent it from rotating during dismantling and re-assembly operations.

Turning now to FIGS. 6 to 8, the second embodiment of caliper therein illustrated comprises a hydraulic cylinder 60 having a pair of rearwardly extending lugs 62 providing a pivotal mounting for a mechanical brake operating lever 64. In conventional manner, the cylinder 60 contains a hydraulic piston which is capable of being displaced under the action of pressure fluid admitted to the cylinder in order correspondingly to displace a directly actuated friction element adjoining the front end of the cylinder and comprising a backplate 66 carrying a pad 68 of friction material. At diametrically opposed side regions, the hydraulic cylinder 60 is provided with a pair of L-shaped arms 70, the free end regions of which are downwardly directed and fitted with pivot pins 72 by which the caliper is adapted to be pivotally mounted on a fixed part of a vehicle. The portion of each arm 70 adjoining the cylinder is formed with a flat upper surface constituting a seating for a limb 76 of a generally C-shaped yoke 74 and enabling the yoke to be detachably secured to the cylinder by bolts 78. The yoke 74 extends forwardly of the cylinder 60, that is to say, in an axial direction relative to a brake disc (not shown) with which the caliper is to coact and is arranged chordally to circumscribe that disc with the latter situated in a central aperture 80 of the yoke.

The yoke 74 supports foth the friction element 66, 68 and a second and indirectly actuated friction element comprising a backplate 82 carrying a pad 84 of friction material. Thus, the indirectly actuated friction element 82, 84 is fixedly secured to the yoke, whilst the directly actuated element 66, 68 is grooved in its lateral edges to engage the facing, parallel edges 77 of the yoke limbs 76. It will, of course, be understood that if a servo effect on the directly actuated friction element is desired, the edges 77 of the yoke limbs may be inclined rather than parallel as illustrated. As mentioned earlier, this piston within the cylinder 60 is arranged to act directly on the friction element 66, 68 and is itself capable of being acted on by a strut 65 displaceable by the lever 64. In this way, provision is made for both hydraulic and mechanical actuation of the brake. For the purpose of ensuring that the directly actuated friction element does not detach itself from the yoke when the pad 68 becomes worn, the lateral edges of the backplate 68 are deformed adjacent the yoke limb edges 77 to produce tabs 69 which remain engaged with the limbs 76 even when the displacement of the friction element becomes pronounced. It will also be noted that the axis of the force input from the piston is offset from the central axis of the directly operated friction element to oppose the couple which is created as the pad 68 engages the brake disc and which is due to the fact that the front face of the pad is axially displaced from the point of contact between its backplate and the yoke.

As in the previous embodiment, the friction elements are easily replaced when worn simply by removing the yoke from the remainder of the caliper by unfastening the bolts 78, leaving the actuator itself unaffected.

What is claimed is:

1. For supporting a pair of friction elements for engaging opposite sides of a brake disc, a yoke, an actuator assembly, said actuator assembly comprising a body member being formed with an internal hydraulic cylinder, a pair of pistons in said cylinder, one of said pistons acting directly upon one of said friction elements, said yoke being detachably secured to the other said piston and extending across said body member to a position in front of the same where it provides a mounting for both said friction elements and a dished plate formed at a lower edge with a pair of spaced tabs, said dished plate being fitted to the rear face of the directly operated friction element with said tabs fitting under said element for radially locating the same and the dished portion of the plate fitting within a recess in the piston acting on said friction element.

References Cited

UNITED STATES PATENTS

| | | |
|---|---|---|
| 3,182,753 | 5/1965 | Gancel. |
| 3,185,263 | 5/1965 | Schanz et al. |

FOREIGN PATENTS

| | | |
|---|---|---|
| 1,388,322 | 12/1964 | France. |
| 968,898 | 9/1964 | Great Britain. |
| 1,031,946 | 6/1966 | Great Britain. |

GEORGE E. A. HALVOSA, Primary Examiner

U.S. Cl. X.R.

188—73.6